(12) United States Patent
Hou et al.

(10) Patent No.: US 11,565,785 B1
(45) Date of Patent: Jan. 31, 2023

(54) MARINE FISHTAIL RUDDER

(71) Applicant: Dalian Maritime University, Dalian (CN)

(72) Inventors: Lixun Hou, Dalian (CN); Ankang Hu, Dalian (CN); Xin Chang, Dalian (CN); Yi Lin, Dalian (CN); Shun Wang, Dalian (CN)

(73) Assignee: DALIAN MARITIME UNIVERSITY, Liaoning (CN)

( * ) Notice: Subject to any disclaimer, the term of this patent is extended or adjusted under 35 U.S.C. 154(b) by 0 days.

(21) Appl. No.: 17/864,052

(22) Filed: Jul. 13, 2022

(30) Foreign Application Priority Data

Jul. 15, 2021 (CN) .......................... 202110801866.2

(51) Int. Cl.
*B63H 25/38* (2006.01)
*B63H 25/24* (2006.01)

(52) U.S. Cl.
CPC ........... *B63H 25/382* (2013.01); *B63H 25/24* (2013.01)

(58) Field of Classification Search
CPC ......... B63B 25/06; B63B 25/24; B63B 25/38; B63B 25/381
USPC ................................ 114/162, 163, 164, 165
See application file for complete search history.

(56) References Cited

U.S. PATENT DOCUMENTS

| | | | | |
|---|---|---|---|---|
| 1,103,820 | A | * 7/1914 | Manson-Olin | B64C 3/14 244/45 R |
| 2,331,706 | A | * 10/1943 | Livingston | B63H 25/38 114/162 |

FOREIGN PATENT DOCUMENTS

| | | |
|---|---|---|
| CN | 101898630 A | 12/2010 |
| CN | 201914448 U | 8/2011 |
| CN | 202193204 U | 4/2012 |
| CN | 105197220 A | 12/2015 |
| CN | 206691351 U | 12/2017 |
| CN | 107585283 A | 1/2018 |
| CN | 108725732 A | 11/2018 |
| KR | 10-2013-0036968 | 4/2015 |

* cited by examiner

*Primary Examiner* — Daniel V Venne
(74) *Attorney, Agent, or Firm* — Muncy, Geissler, Olds & Lowe, P.C.

(57) ABSTRACT

The present invention discloses a marine fishtail rudder, including a rudder blade, a first tail plate and a second tail plate. The rudder blade includes a first rudder surface and a second rudder surface. The first tail plate is hinged on the first rudder surface. The second tail plate is hinged on the second rudder surface. An electric motor is provided in the rudder blade. The electric motor is used to drive the first tail plate and the second tail plate to rotate, so that a trailing edge of the first tail plate and a trailing edge of the second tail plate are close to or away from a trailing edge of the rudder blade. The present invention discloses a marine fishtail rudder, wherein tail plates are respectively arranged on the two rudder surfaces of a rudder tail portion, and the tail plates are rotated by an electric motor. When steering, the tail plates are unfolded to form a rudder shape of a fishtail rudder to obtain a higher rudder effect. When sailing straight or reversing, the tail plates are closed to form a rudder shape of a streamlined rudder and reduce the resistance of the rudder.

3 Claims, 4 Drawing Sheets

MARINE FISHTAIL RUDDER

TECHNICAL FIELD

The present invention relates to the field of marine rudders, particularly, to a marine fishtail rudder.

BACKGROUND ART

Ships are mainly equipped with rudders at the stern to achieve heading stability and slewability, and the performance of the rudder itself has a significant impact on the ship's maneuverability. In order to improve the rudder efficiency, there have been successively proposed a series of special rudder shapes, among which the rudder effect of fishtail rudder is particularly prominent. The cross-sectional shape of fishtail rudder is like a flat fish, and compared with streamlined rudder, the shape of fishtail rudder further includes a fish-shaped tail sealing plate.

When a fishtail rudder is in the steering state, the water pressure on the upstream surface at the rear of the rudder blade increases, and that significantly improves the rudder efficiency. However, the water resistance of the fishtail rudder will also increase significantly in the state of straight sailing or reversing, and thus, the performance of straight sailing or reversing will be significantly degraded.

SUMMARY OF INVENTION

The present invention provides a marine fishtail rudder to overcome the above technical problem.

A marine fishtail rudder, including: a rudder blade; a first tail plate; and a second tail plate, wherein:

the rudder blade includes a first rudder surface and a second rudder surface, the first tail plate is hinged on the first rudder surface, and the second tail plate is hinged on the second rudder surface; and an electric motor is provided in the rudder blade, the electric motor is used to drive the first tail plate and the second tail plate to rotate, so that a trailing edge of the first tail plate and a trailing edge of the second tail plate are close to or away from a trailing edge of the rudder blade.

Further, the first rudder surface is provided with a first tail plate groove, and a leading edge of the first tail plate is hinged in the first tail plate groove, and when the trailing edge of the first tail plate coincides with the trailing edge of the rudder blade, a side surface of the first tail plate is smoothly connected to the first rudder surface; and the second rudder surface is provided with a second tail plate groove, and a leading edge of the second tail plate is hinged in the second tail plate groove, and when the trailing edge of the second tail plate coincides with the trailing edge of the rudder blade, a side surface of the second tail plate is smoothly connected to the second rudder surface.

Further, the leading edge of the first tail plate is provided with a first rotating shaft, the leading edge of the second tail plate is provided with a second rotating shaft, a cylindrical pin is provided at each of two ends of the first rotating shaft and each of two ends of the second rotating shaft, a pin hole is provided in each of the first tail plate groove and the second tail plate groove, the cylindrical pin is inserted into the pin hole, and a first gear tooth on the first rotating shaft is engaged with a second gear tooth on the second rotating shaft.

Further, a gear shaft is provided in the rudder blade, and the gear shaft is engaged with the first gear tooth.

The marine fishtail rudder further includes: a support part, wherein: an end of the support part is fixedly connected to the first gear tooth, the other end of the support part is fixedly connected to the first tail plate, a connecting hole is provided on the rudder blade, and the support part passes through the connecting hole.

The present invention discloses a marine fishtail rudder, wherein tail plates are respectively arranged on the two rudder surfaces of a rudder tail portion, and the tail plates are rotated by an electric motor. When steering, the tail plates are unfolded to form a rudder shape of a fishtail rudder to obtain a higher rudder effect. When sailing straight or reversing, the tail plates are closed to form a rudder shape of a streamlined rudder and reduce the resistance of the rudder.

BRIEF DESCRIPTION OF DRAWINGS

In order to describe the embodiments of the present invention or the technical solutions in the prior art more clearly, the following briefly introduces the accompanying drawings that need to be used in the description of the embodiments or the prior art. Obviously, the accompanying drawings in the following description are some embodiments of the present invention, and for a person skilled in the art, other drawings can also be obtained from these accompanying drawings without creative effort.

EXPLANATION OF REFERENCE NUMERALS

1. rudder blade; 11. first rudder surface; 12. second rudder surface; 13. first tail plate groove; 14. second tail plate groove; 15. first rotating shaft; 16. second rotating shaft; 17. cylindrical pin; 18. pin hole; 19. first gear tooth; 20. second gear tooth; 2. first tail plate; 3. second tail plate; 4. electric motor; 5. gear shaft; 6. support part; 7. connecting hole.

DESCRIPTION OF EMBODIMENTS

In order to make the purposes, technical solutions and advantages of the embodiments of the present invention clearer, the technical solutions in the embodiments of the present invention will be clearly and completely described below with reference to the accompanying drawings in the embodiments of the present invention. Obviously, the embodiments to be described are some, but not all, embodiments of the present invention. Based on the embodiments of the present invention, all other embodiments obtained by a person skilled in the art without creative efforts are within the protection scope of the present invention.

Figure 1:
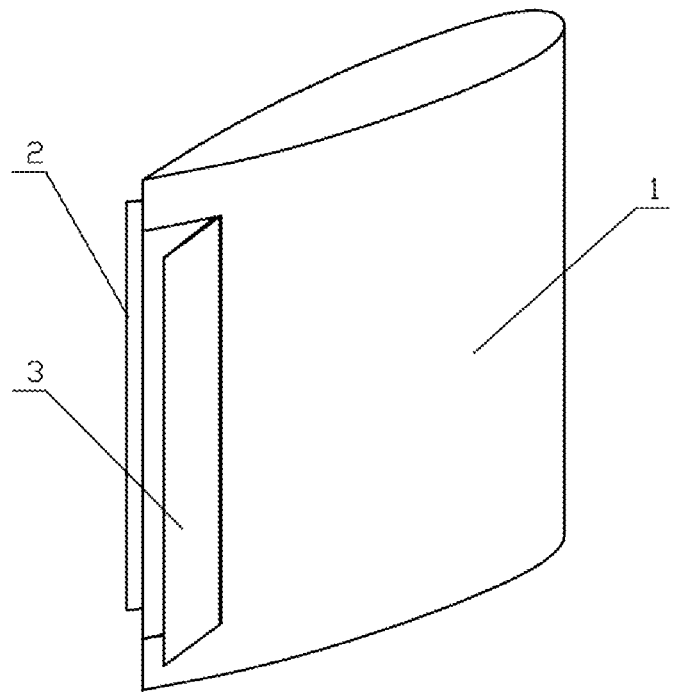
FIG. 1 is a schematic structural diagram of a marine fishtail rudder according to an embodiment of the present invention.
Figure 2:
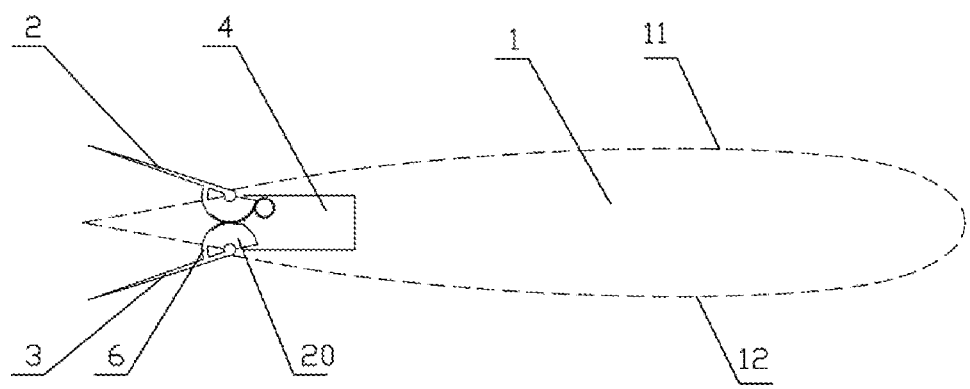
FIG. 2 is a top-view structural schematic diagram of the marine fishtail rudder according to the embodiment of the present invention.

FIG. 1 and FIG. 2 show a marine fishtail rudder, including: a rudder blade 1; a first tail plate 2; and a second tail plate 3, wherein:

the rudder blade 1 includes a first rudder surface 11 and a second rudder surface 12, the first tail plate 2 is hinged on the first rudder surface 11, and the second tail plate 3 is hinged on the second rudder surface 12; and an electric motor 4 is provided in the rudder blade 1, the electric motor 4 is used to drive the first tail plate 2 and the second tail plate 3 to rotate, so that a trailing edge of the first tail plate 2 and a trailing edge of the second tail plate 3 are close to or away from a trailing edge of the rudder blade 1.

In this embodiment, tail plates are respectively arranged on the two rudder surfaces of a rudder tail portion, and the tail plates are rotated by an electric motor. When steering, the tail plates are unfolded to form a rudder shape of a fishtail rudder to obtain a higher rudder effect. When sailing straight or reversing, the tail plates are closed to form a rudder shape of a streamlined rudder and reduce the resistance of the rudder.

Specifically, the first rudder surface 11 is provided with a first tail plate groove 13, and a leading edge of the first tail plate 2 is hinged in the first tail plate groove 13, and when the trailing edge of the first tail plate 2 coincides with the trailing edge of the rudder blade 1, a side surface of the first tail plate 2 is smoothly connected to the first rudder surface 11; and the second rudder surface 11 is provided with a second tail plate groove 14, and a leading edge of the second tail plate 2 is hinged in the second tail plate groove 14, and when the trailing edge of the second tail plate 2 coincides with the trailing edge of the rudder blade 1, a side surface of the second tail plate 2 is smoothly connected to the second rudder surface 11.

The first tail plate groove 13 and the second tail plate groove 14 are opened at a tail of the rudder blade and gradually become shallower from the leading edge to the trailing edge of the rudder blade. The first tail plate 2 and the second tail plate 3 gradually become thinner from the leading edge to the trailing edge. The first tail plate fits the shape of the first tail plate groove, and the second tail plate fits the shape of the second tail plate groove. In a combined state, the first tail plate and the second tail plate are just completely embedded in the first tail plate groove and the second tail plate groove, so that the rudder blade has the rudder shape of a streamlined rudder.

Figure 3:
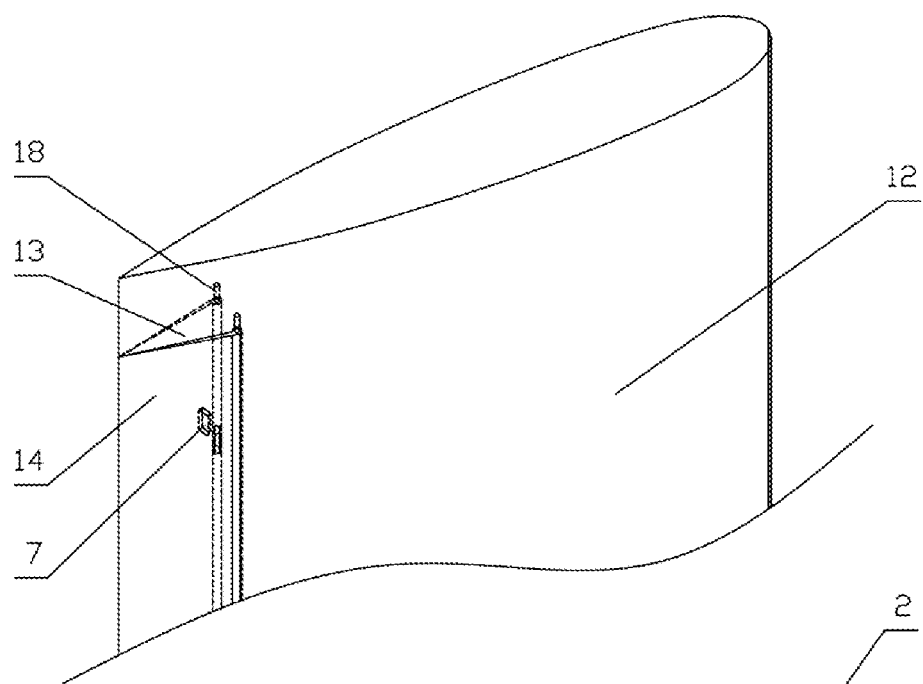
FIG. 3 is a schematic structural diagram of a rudder blade according to the embodiment of the present invention.
Figure 4:
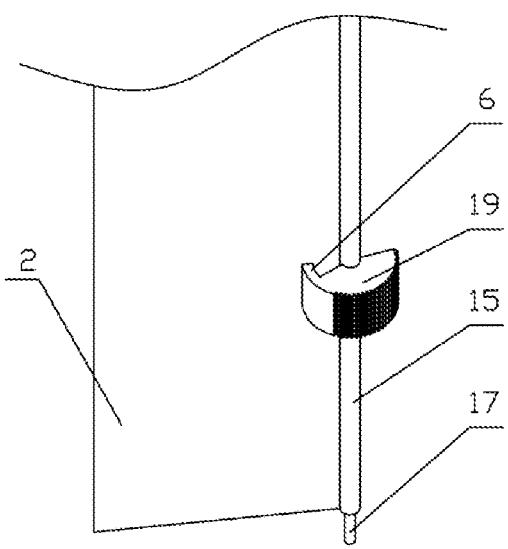
FIG. 4 is a schematic structural diagram of a first tail plate according to the embodiment of the present invention.
Figure 5:
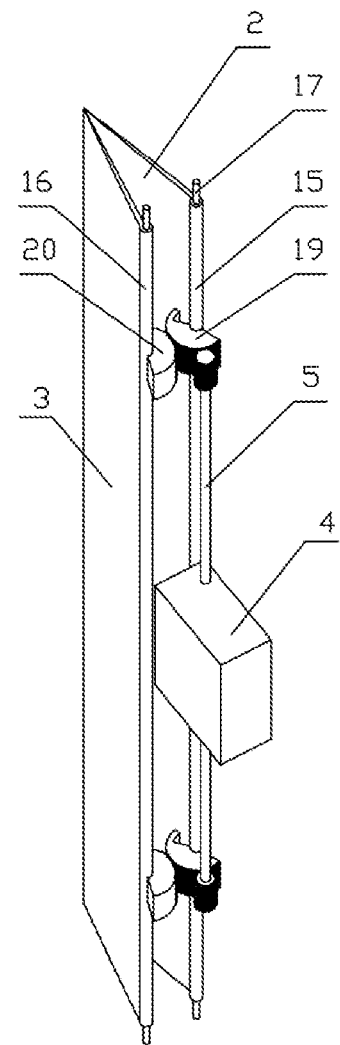
FIG. 5 is a schematic structural diagram of the first tail plate and a second tail plate according to the embodiment of the present invention.

As shown in FIGS. 3-5, the leading edge of the first tail plate 2 is provided with a first rotating shaft 15, the leading edge of the second tail plate 3 is provided with a second rotating shaft 16, a cylindrical pin 17 is provided at each of two ends of the first rotating shaft 15 and at each of two ends of the second rotating shaft 16, a pin hole 18 is provided in each of the first tail plate groove 13 and the second tail plate groove 14, the cylindrical pin 17 is inserted into the pin hole 18, and a first gear tooth 19 on the first rotating shaft 15 is engaged with a second gear tooth 20 on the second rotating shaft 16.

The first tail plate 2 and the second tail plate 3 can rotate synchronously and reversely via the first gear tooth 19 and the second gear tooth 20, so that the first tail plate 2 and the second tail plate 3 rotate by the same angle.

A gear shaft 5 is provided in the rudder blade, and the gear shaft 5 is engaged with the first gear tooth 19. The electric motor 4 drives the gear shaft 5 to rotate. The gear shaft 5 is engaged with the first gear tooth 19 to drive the first tail plate 2 to rotate, and the first gear tooth 19 drives the second tail plate 3 to rotate.

In this embodiment, the marine fishtail rudder also includes a support part 6, and the support part 6 is used to support the tail plate. An end of the support part of the first tail plate is fixedly connected to the first gear tooth 19, and the other end is fixedly connected to the first tail plate 2. An end of the support part 6 of the second tail plate is fixedly connected to the second gear tooth 20, and the other end is fixedly connected to the second tail plate 3. Each of the two rudder surfaces of the rudder blade 1 is provided with a connecting hole 7, and the support part 6 passes through the connecting hole 7. The support part 6 increases the stability of the tail plate, reduces the shaking and deformation of the tail plate due to force during steering, and improves the rudder efficiency.

Figure 6:
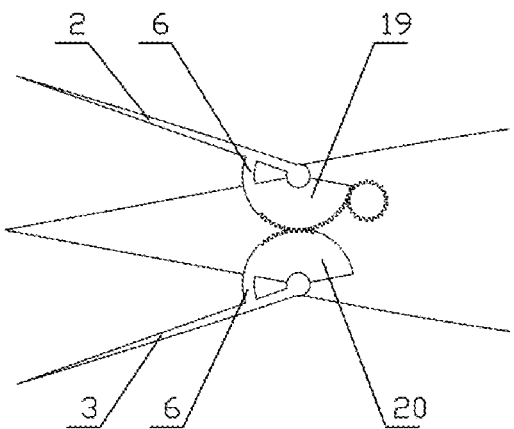
FIG. 6 is a schematic diagram of an unfolded state of the marine fishtail rudder tail plates according to the embodiment of the present invention.
Figure 7:
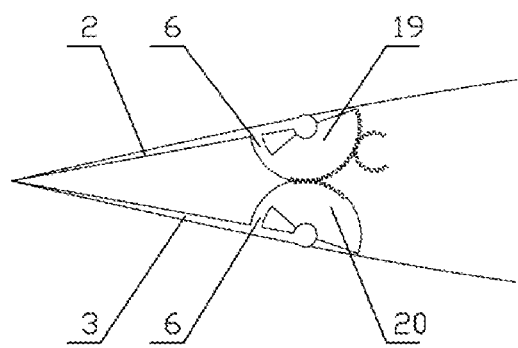
FIG. 7 is a schematic diagram of a closed state of the marine fishtail rudder tail plate according to the embodiment of the present invention.

As shown in FIG. 6 and FIG. 7, when the tail plates are unfolded, the rudder is a fishtail rudder, and when the tail plates are folded, the rudder is a streamlined rudder. The marine fishtail rudder disclosed by the present invention can be converted into different rudder shapes according to requirements and adapt to different usage requirements, and thus, the marine fishtail rudder not only obtains high rudder efficiency, but also ensures that no large resistance is generated when sailing straight or reversing.

Figure 8:
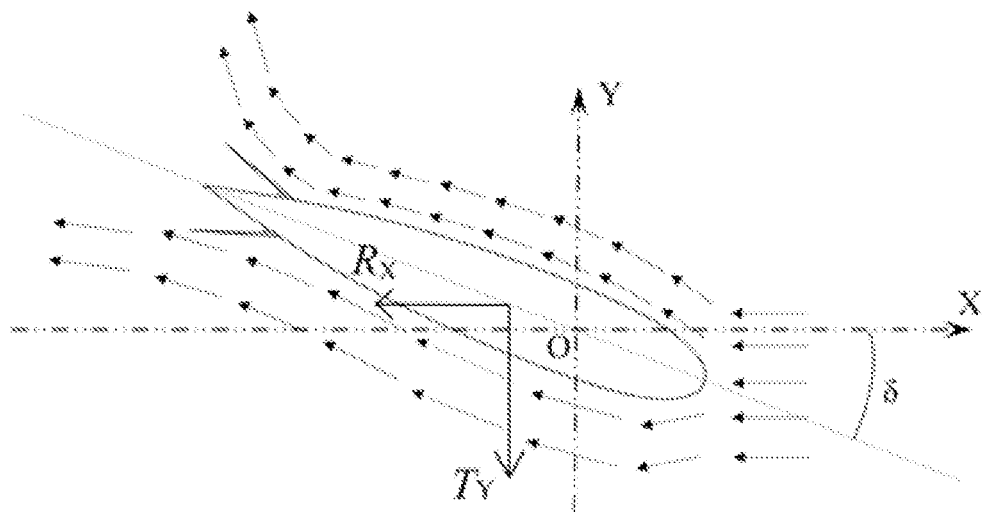
FIG. 8 is a schematic diagram of the flow field distribution and hydrodynamics under the steering state of the marine fishtail rudder according to the embodiment of the present invention.

As shown in FIG. 8, when the rudder blade is in the steering state, the first tail plate 2 and the second tail plate 3 are unfolded by the electric motor 4 and the transmission gear system, and the entire rudder profile is fishtail-shaped and effectively reduces the fluid velocity on the upstream surface of the rudder blade 1. Thus, the corresponding pressure distribution is significantly improved, and the corresponding pressure is significantly greater than the pressure on the backflow surface, so that the lateral force TY directed to the starboard side is significantly increased, thereby increasing the turning moment of the ship turning to the left. In addition, the longitudinal resistance RX increases synchronously with TY, and thus has a significant braking effect on the ship.

Figure 9:
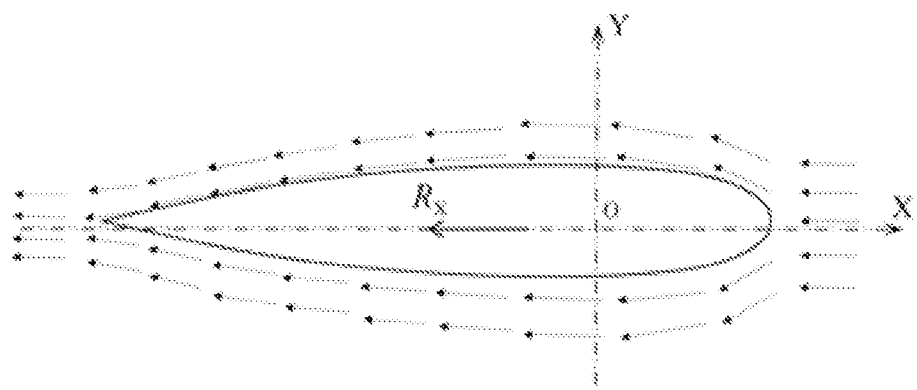
FIG. 9 is a schematic diagram of the flow field distribution and hydrodynamics under the straight sailing state of the marine fishtail rudder according to the embodiment of the present invention.

As shown in FIG. 9, when there is no steering, the first tail plate 2 and the second tail plate 3 are in a closed state under the drive of the electric motor 4 and the transmission gear system, and the entire rudder blade 1 is streamlined and can effectively reduce water resistance, thereby improving the ship's straight sailing or reversing performance.

Finally, it should be noted that the above embodiments are only used to illustrate the technical solutions of the present invention, but not to limit them. Although the present invention has been described in detail with reference to the foregoing embodiments, a person skilled in the art should understand that the technical solutions described in the foregoing embodiments can still be modified, or some or all of the technical features thereof can be equivalently substituted. However, these modifications or substitutions do not make the essence of the corresponding technical solutions deviate from the scope of the technical solutions of the embodiments of the present invention.

The invention claimed is:

1. A marine fishtail rudder, comprising: a rudder blade; a first tail plate; and a second tail plate, wherein:

the rudder blade includes a first rudder surface and a second rudder surface, the first tail plate is hinged on the first rudder surface, and the second tail plate is hinged on the second rudder surface;

an electric motor is provided in the rudder blade, the electric motor is used to drive the first tail plate and the second tail plate to rotate, so that a trailing edge of the first tail plate and a trailing edge of the second tail plate are close to or away from a trailing edge of the rudder blade;

the first rudder surface is provided with a first tail plate groove, and a leading edge of the first tail plate is hinged in the first tail plate groove, and when the trailing edge of the first tail plate coincides with the trailing edge of the rudder blade, a side surface of the first tail plate is smoothly connected to the first rudder surface;

the second rudder surface is provided with a second tail plate groove, and a leading edge of the second tail plate is hinged in the second tail plate groove, and when the trailing edge of the second tail plate coincides with the trailing edge of the rudder blade, a side surface of the second tail plate is smoothly connected to the second rudder surface; and the leading edge of the first tail plate is provided with a first rotating shaft, the leading edge of the second tail plate is provided with a second rotating shaft, a cylindrical pin is provided at each of two ends of the first rotating shaft and each of two ends of the second rotating shaft, a pin hole is provided in each of the first tail plate groove and the second tail plate groove, the cylindrical pin is inserted into the pin hole, and a first gear tooth on the first rotating shaft is engaged with a second gear tooth on the second rotating shaft.

2. The marine fishtail rudder according to claim 1, wherein: a gear shaft is provided in the rudder blade, and the gear shaft is engaged with the first gear tooth.

3. The marine fishtail rudder according to claim 1, further comprising: a support part, wherein: an end of the support part is fixedly connected to the first gear tooth, the other end of the support part is fixedly connected to the first tail plate, a connecting hole is provided on the rudder blade, and the support part passes through the connecting hole.

\* \* \* \* \*